Figure 1:
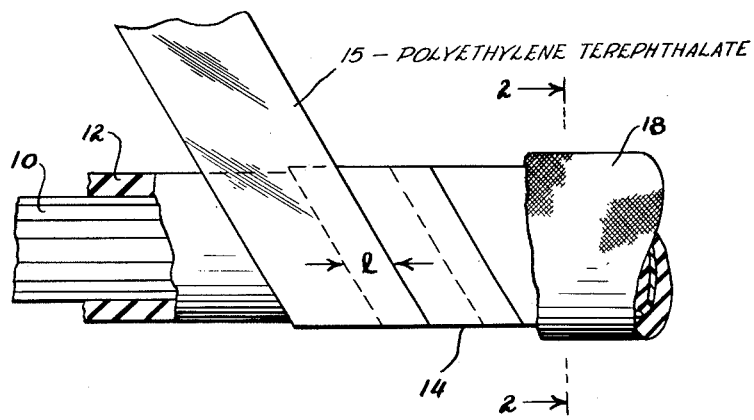

Jan. 30, 1962

T. DE LUTIS 3,019,285

ELECTRICAL CABLE WITH PROTECTING LAYER OF
POLYETHYLENE TEREPHTHALATE

Filed Dec. 3, 1958

INVENTOR.
Thomas De Lutis
BY Emery, Whittemore
Sandoe & Dix
ATTORNEYS

3,019,285
ELECTRICAL CABLE WITH PROTECTING LAYER OF POLYETHYLENE TEREPHTHALATE

Thomas Delutis, Corapolis, Pa., assignor, by mesne assignments, to H. K. Porter Company, Inc., Pittsburgh, Pa., a corporation of Delaware
Filed Dec. 3, 1958, Ser. No. 777,888
2 Claims. (Cl. 174—120)

This invention relates to insulated wires which are used for electric circuits; and the invention relates more particularly to wire of the type which is used in buildings.

Such wires are provided with a center conductor, usually stranded, with a layer of insulation around the wire and two protecting layers over the insulation for preventing mechanical injury such as abrasion. The insulation is ordinarily made of rubber and it is vulcanized after being applied to the conductor. For the kinds of wire with which this invention is concerned, the Underwriter's Laboratories require two protecting layers over the rubber insulation. The first of these layers has been a cotton braid or a rubberized tape for the last thirty years. The second or outer layer is a braided covering, usually made of cotton treated with some bituminous material to protect the tape from moisture.

It is an object of this invention to provide an improved insulated wire suitable for use in buildings and which is of better quality and at the same time less expensive to manufacture as compared with building wire of the prior art. This invention uses, in place of the conventional rubberized tape or other protecting layer, a polyethylene terephthalate tape. This material is waterproof, absorbs practically no moisture, has high tensile strength and is resistant to abrasion. All of these properties make it particularly well suited as the inner protective covering over the rubber insulation in electric wiring.

Polyethylene terephthalate has been used in the manufacture of wires for different purposes and at different locations than with this invention. For example, the Navy has used shipboard cables having silicone insulated conductors with a layer of polyethylene terephthalate covering the silicon insulation and underlying an outer layer of polyvinyl chloride for the purpose of preventing migration of the plasticizers from the polyvinyl chloride to the silicone insulation. Such migration causes electrical deterioration of the silicone insulation.

Polyethylene terephthalate has also been used in communication cables as a mechanical barrier between copper shields which are applied either to single or groups of conductors of a multi-conductor cable construction. The function of the polyethylene terephthalate in such cables is to prevent puncture of the insulations by broken ends of the copper shield wires.

Building wire does not involve these same considerations, and is a type of wire which must be less expensive than the special wires used on ships and for communications. For these reasons the use of polyethylene terephthalate in building wire seemed prohibitive because of the fact that the polyethylene terephthalate is much more expensive than rubberized tape; the polyethylene terephthalate at the present time being approximately three times as expensive per pound as rubberized tape. Because of the great strength of polyethylene terephthalate in tension and its good abrasion resistance, polyethylene terephthalate tape can be used with a thickness as low as 0.001 inch. With such thin tape polyethylene terephthalate is more economical to use than rubberized tape, but it is an unexpected result that such thin polyethylene terephthalate tape produces a better insulated cable than does rubberized tape.

The reason that the thin polyethylene terephthalate tape is able to provide abrasion resistance equal to much thicker layers of rubberized tape seems to be partially because polyethylene terephthalate has great strength, but perhaps more particularly because of the fact that the polyethylene terephthalate, provides a very smooth surface which is slippery and because of its low friction particularly resistant to abrasion. This smoothness might seem to be a disadvantage for the purposes of this invention because of the fact that the polyethylene terephthalate is helically wound over the insulation and it is essential that the protecting layer must not shift longitudinally on the insulation. Furthermore, the polyethylene terephthalate provides a layer separating the insulation from the braided outer covering of the wire and it is also essential that this outer covering must not slip longitudinally with respect to the insulated wire which it surrounds.

When wrapped tightly in a helix over an underlying covering of rubber insulation, or its equivalent, and particularly over vulcanized rubber surface, the polyethylene terephthalate has high resistance to any longitudinal slippage; and experience has shown that a braided sheath of cotton, or other fibrous material, especially when treated with a bituminous coating to protect it from moisture, has sufficiently high friction with the polyethylene terephthalate to prevent slippage of the sheath lengthwise of the cable.

It may be said, therefore, that another object of the invention is to provide a rubber insulated wire with two layers of protecting material, the underlying layer of which is moisture proof and smooth covering of polyethylene terephthalate and the outer layer of which is braided and with a higher friction surface.

Other objects, features and advantages of the invention will appear or be pointed out as the description proceeds.

Figure 2:
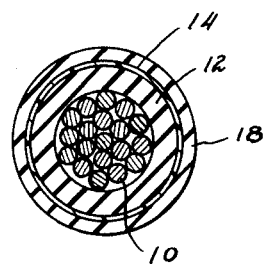

In the drawing, forming a part hereof, in which like reference characters indicate corresponding parts in all the views:

FIGURE 1 is a view, partly broken away and partly in section, showing an insulated wire made in accordance with this invention, and FIGURE 2 is a sectional view taken on the line 2—2 of FIGURE 1.

The drawing shows a center conductor 10, illustrated as a stranded conductor, surrounded by rubber insulation 12. This insulation is of the type conventionally used on building wire. The Underwriter's Laboratories require that building wire have two protecting layers over the rubber insulation 12.

With this invention the first or inner protecting layer 14 is formed by wrapping a polyethylene terephthalate tape 15 around the outside surface of the rubber insulation 12. This tape 15 is wrapped on the surface of the rubber insulation 12 after the insulation has been vulcanized; and the tape is wound as a helix around the insulation with each convolution of the helix overlapping the preceding convolution for a distance represented by the dimensional indication "*l*." It is important that the polyethylene terephthalate tape 15 be wrapped tightly over the surface of the rubber insulation 12.

The tape 15 has a preferred thickness of approximately 0.001 inch. This thickness is sufficient to provide protection for the insulation 12 equal to that provided by rubber covered insulation against mechanical damage generally and to afford somewhat better protection against abrasion damage in particular. On the other hand, this very thin tape is pliant when subjected to local radiant forces and this is of significance in connection with the clamping of the tape into more intimate local contact with the rubber insulation 12 by the outer protecting layer as will be more fully explained.

An outer protecting layer 18 covers the polyethylene terephthalate layer 14. This outer layer 18 is preferably made of cotton woven to form a braid and treated with bituminous material in order to protect the cotton from moisture. Such woven cotton braid is commonly used as a sheath for wire and it has the advantage of durability and low cost. For some purposes, this cotton sheath may be considered as merely representative of a woven sheath made of fibrous material.

The outside sheath 18 is woven over the polyethylene terephthalate layer 14 progressively along the length of the wire, and is applied tightly around the polyethylene terephthalate layer 14 so that the sheath compresses or clamps the polyethylene terephthalate tape 15 into more intimate contact with the underlying surface of the rubber insulation 12.

Because of the braided construction of the sheath 18, the pressure applied by the sheath to the polyethylene terephthalate tape 15 is an uneven pressure, that is, the high regions of the braid (the portions of the braid extending furtherest inward in a radial direction) exert a higher pressure against the tape 15 than do the intermediate regions of the braid and this results in regions of higher localized clamping pressure by the braid to force the tape 15 against the surface of the rubber insulation 12. This "local spot clamping," as it may be called, increases the friction pressure for resisting any longitudinal slippage of the smooth polyethylene terephthalate layer 14 with respect to either the rubber insulation 12 or the braided sheath 18, and this also prevents longitudinal movement of the sheath 18 with respect to the rubber insulation 12.

When the wire of this invention is exposed to wet conditions over a period of time, some moisture penetrates the outer sheath 18, but it is not absorbed by the inner protecting layer 14. This has the advantage that the cable will dry out more quickly when the moist conditions no longer exist, whereas with conventional cables the rubberized tape absorbs some moisture in addition to that absorbed by the outer sheath. The cable of this invention is, therefore, more resistant to rot.

Another advantage of the invention, as compared to conventional building wire, is that the polyethylene terephthalate has a high resistance to electrical breakdown, either wet or dry, whereas the usual rubberized tape has negligible electrical resistance when dry and none when wet. Although the fibrous coverings of building wire are not used to perform any electrical function, the polyethylene terephthalate layer of this invention not only performs the insulation protecting function of the usual inner layer but also adds to the electrical resistance of the cable; and it is possible to make the cable of this invention with a thinner layer of rubber insulation 12 and still obtain the electrical protection provided by conventional cables with thicker rubber insulation.

The preferred construction of the invention has been illustrated and described, but changes and modifications can be made, and some features can be used in different combinations without departing from the invention as defined in the claims.

What is claimed is:

1. Building wire comprising a single stranded conductor surrounded by a layer of rubber insulation that has a generally cylindrical outside surface, a protective layer over said outside surface of the rubber insulation and consisting of a thin, smooth and slippery strip of polyethylene terephthalate wound over the rubber insulation in a helix and with portions of each successive convolution overlapping a portion and only a portion of the next convolution of the helix whereby each convolution is in intimate contact with the rubber for a portion of the axial length of the convolution and is held away from the surface of the rubber along another portion of the axial length, the strip of polyethylene terephthalate being tightly wound about the rubber insulation, a woven braid of insulating material over the polyethylene terephthalate layer with strands of the braid that pass under other strands pressed tightly against the helically wound strip to produce local spot clamping of the strip against the rubber insulation to prevent axial movement of the strip relative to the surface of the rubber.

2. A building wire described in claim 1, and in which the strip is of a thickness at least as thin as 0.001 inch.

References Cited in the file of this patent

UNITED STATES PATENTS

| 2,034,992 | Schatzel | Mar. 24, 1936 |
| 2,235,536 | Savage et al. | Mar. 18, 1941 |
| 2,851,515 | Kolmorgen et al. | Sept. 9, 1958 |

FOREIGN PATENTS

| 599,097 | Great Britain | Mar. 4, 1948 |
| 161,646 | Australia | Mar. 3, 1955 |

OTHER REFERENCES

General Cable Corp. (Publication), Catalog RC-37, copyright 1938, page 57.

Du Pont (Publication), copyright 1956 by McGraw-Hill, 330 West 42nd St., New York 35, N.Y. (6 pages).